US008625430B2

(12) United States Patent  (10) Patent No.: US 8,625,430 B2
Li et al.  (45) Date of Patent: Jan. 7, 2014

(54) METHOD AND SYSTEM FOR IMPLEMENTING SMOOTHING OF SIGNALING TRAFFIC, AND HOME LOCATION REGISTER

(75) Inventors: Shiqian Li, Xi'an (CN); Sihai Ye, Shenzhen (CN); Ridong Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 129 days.

(21) Appl. No.: 13/368,759

(22) Filed: Feb. 8, 2012

(65) Prior Publication Data

US 2012/0134269 A1 May 31, 2012

Related U.S. Application Data

(63) Continuation of application No. PCT/CN2010/075866, filed on Aug. 11, 2010.

(30) Foreign Application Priority Data

Aug. 12, 2009 (CN) .......................... 2009 1 0108900

(51) Int. Cl.
*H04L 12/26* (2006.01)
*H04W 4/00* (2009.01)
*H04W 24/00* (2009.01)
*G06F 15/173* (2006.01)

(52) U.S. Cl.
USPC ......... 370/235; 455/433; 455/456.1; 709/224

(58) Field of Classification Search
None
See application file for complete search history.

(56) References Cited

U.S. PATENT DOCUMENTS 6,181,937 B1    1/2001 Joensuu
6,526,282 B1 *  2/2003 Kadoshima et al. .......... 455/453
2003/0027571 A1 * 2/2003 Karlsson et al. .............. 455/433

(Continued)

FOREIGN PATENT DOCUMENTS

CN    1455604 A    11/2003
CN    1984461 A    6/2007

(Continued)

OTHER PUBLICATIONS

Written Opinion of the International Searching Authority dated Nov. 18, 2010 in connection with International Patent Application No. PCT/CN2010/075866.
International Search Report dated Nov. 18, 2010 in connection with International Patent Application No. PCT/CN2010/075866.

(Continued)

*Primary Examiner* — Clemence Han

(57) ABSTRACT

Embodiments of the present invention provide a method and a system for implementing smoothing of signaling traffic, and a home location register. The method includes: when a link between an HLR and an exchange device is congested or the HLR is overloaded, receiving, by the HLR, a location update request message of a user equipment UE sent by the exchange device, and returning a location update response message to the exchange device, so as to inform the exchange device that the location update of the UE is successful, where the HLR does not send user data corresponding to the UE to the exchange device; and when the link between the HLR and the exchange device is normal, the load of the HLR is normal, or the UE performs a service, sending, by the HLR, the user data corresponding to the UE to the exchange device.

21 Claims, 4 Drawing Sheets

(56) References Cited

U.S. PATENT DOCUMENTS

| | | | |
|---|---|---|---|
| 2006/0014531 A1* | 1/2006 | Nam et al. | 455/418 |
| 2007/0287475 A1* | 12/2007 | Jeong et al. | 455/456.6 |
| 2009/0029677 A1* | 1/2009 | Choi et al. | 455/411 |
| 2010/0057485 A1* | 3/2010 | Luft | 705/1 |

FOREIGN PATENT DOCUMENTS

| | | |
|---|---|---|
| CN | 101400038 A | 4/2009 |
| CN | 101483854 A | 7/2009 |
| CN | 101686454 A | 3/2010 |
| KR | 20080056374 A | 6/2008 |

\* cited by examiner

When a link between an HLR and an exchange device is congested or the HLR is overload, the HLR receives a location update request message of a user equipment UE sent by the exchange device, and returns a location update response message to the exchange device, so as to inform the exchange device that the location update of the UE is successful, where the HLR does not send user data corresponding to the UE to the exchange device 　／⎯ 101

When the link between the HLR and the exchange device is normal, the load of the HLR is normal, or the UE performs a service, the HLR sends the user data corresponding to the UE to the exchange device 　／⎯ 102

FIG. 1

METHOD AND SYSTEM FOR IMPLEMENTING SMOOTHING OF SIGNALING TRAFFIC, AND HOME LOCATION REGISTER

CROSS-REFERENCE TO RELATED APPLICATIONS

This application is a continuation of International Application No. PCT/CN2010/075866, filed on Aug. 11, 2010, which claims priority to Chinese Patent Application No. 200910108900.7, filed on Aug. 12, 2009, both of which are hereby incorporated by reference in their entireties.

TECHNICAL FIELD

The present invention relates to the field of mobile communications, and in particular, to a method and a system for implementing smoothing of signaling traffic, and a home location register.

BACKGROUND

In a mobile communication system, two typical entities exist for saving user data, one is a home location register (HLR, Home Location Register) of a user equipment (UE, User Equipment), and the other one is a visitor location register (VLR, visitor location register) of the UE. The HLR manages information about a subscribed mobile user, all user data is stored in the HLR, and an address of a VLR currently visited by the UE is recorded in the user data. The VLR stores information for calling or other purposes of a mobile user visiting the VLR, and the information records an address of a location area that the UE resides. The user data in the HLR is static and permanent in a user survival period, while user data in the VLR is dynamic and exists only when the UE roams in the VLR. Lost user data in the VLR may be re-obtained from the HLR through a location update or data recovery.

During the implementation of the present invention, the inventors find:

In a case, after the VLR is reset due to a VLR upgrade, restarting caused by a fault, or another reason, registration of the user needs to be performed, that is, the VLR sends a location update request message to the HLR; or as for a machine user, when power supply is restored after mains power-off, a great number of machine users may be restarted and location updates may be initiated in batch. If a great number of registrations are performed in the VLR at the same time, message traffic at a D interface between the VLR and the HLR jumps sharply, and message congestion and a system breakdown easily occur.

In another case, when the HLR is overloaded, the HLR refuses a location update service; however, since the location update of the UE is automatically performed by a terminal, the terminal may make repeated retries till the location update is successful when the location update fails. In an existing network, it is found through actual detection that, a part of terminals may make repeated retries after a failure till the location update is successful, so the HLR fails to achieve an objective of reducing traffic through refusing the location update request message, which may lead to a higher load, a worsened condition or even the system breakdown.

SUMMARY

Embodiments of the present invention provide a method and a system for implementing smoothing of signaling traffic, and a home location register, so as to improve a success ratio of a location update of a UE when a link between an HLR and a VLR is congested or the HLR is overloaded, and avoid a system breakdown due to message congestion.

An embodiment of the present invention provides a method for implementing smoothing of signaling traffic, which includes:

when a link between an HLR and an exchange device is congested or the HLR is overloaded, receiving, by the HLR, a location update request message of a user equipment UE sent by the exchange device, and returning a location update response message to the exchange device, so as to inform the exchange device that the location update of the UE is successful, where the HLR does not send user data corresponding to the UE to the exchange device; and when the link between the HLR and the exchange device is normal, the load of the HLR is normal, or the UE performs a service, sending, by the HLR, the user data corresponding to the UE to the exchange device.

An embodiment of the present invention provides a home location register HLR, which includes:

a receiving unit, configured to receive a location update request message of a user equipment UE sent by an exchange device;

a sending unit, configured to return a location update response message to the exchange device when a link between the home location register HLR and the exchange device is congested or the HLR is overloaded, so as to inform the exchange device that the location update of the UE is successful, where the HLR does not send user data corresponding to the UE to the exchange device; and an insertion unit, configured to enable the HLR to send the user data corresponding to the UE to the exchange device when the link between the HLR and the exchange device is normal, the load of the HLR is normal, or the UE performs a service.

An embodiment of the present invention provides a system for implementing smoothing of signaling traffic, which includes a home location register HLR and an exchange device, where the exchange device is configured to send a location update request message of a user equipment UE to the HLR; and the HLR is configured to receive the location update request message sent by the exchange device when a link between the HLR and the exchange device is congested or the HLR is overloaded, and return a location update response message to the exchange device, so as to inform the exchange device that the location update of the UE is successful, where the HLR does not send user data corresponding to the UE to the exchange device; and when the link between the HLR and the exchange device is normal, the load of the HLR is normal, or the UE performs a service, the HLR sends the user data corresponding to the UE to the exchange device.

The embodiments of the present invention provide the method and the system for implementing smoothing of signaling traffic, and the home location register, which reduces the signaling traffic and the load of the HLR by canceling the sending of the user data corresponding to the UE to the exchange device in the case that the link between the HLR and the exchange device is congested or the HLR is overloaded, thereby effectively achieving an objective of controlling system traffic and avoiding a vicious circle of repeated location updates and the HLR breakdown when link signaling congestion or HLR overload occurs. Furthermore, when the link between the HLR and the exchange device is normal, the load of the HLR is normal, or the UE performs a service, the HLR sends the user data corresponding to the UE to the exchange device, thereby achieving normal performing of the service.

BRIEF DESCRIPTION OF THE DRAWINGS

FIG. 1 is a schematic flowchart of a method for implementing smoothing of signaling traffic according to an embodiment of the present invention;

DETAILED DESCRIPTION

Figure 2:
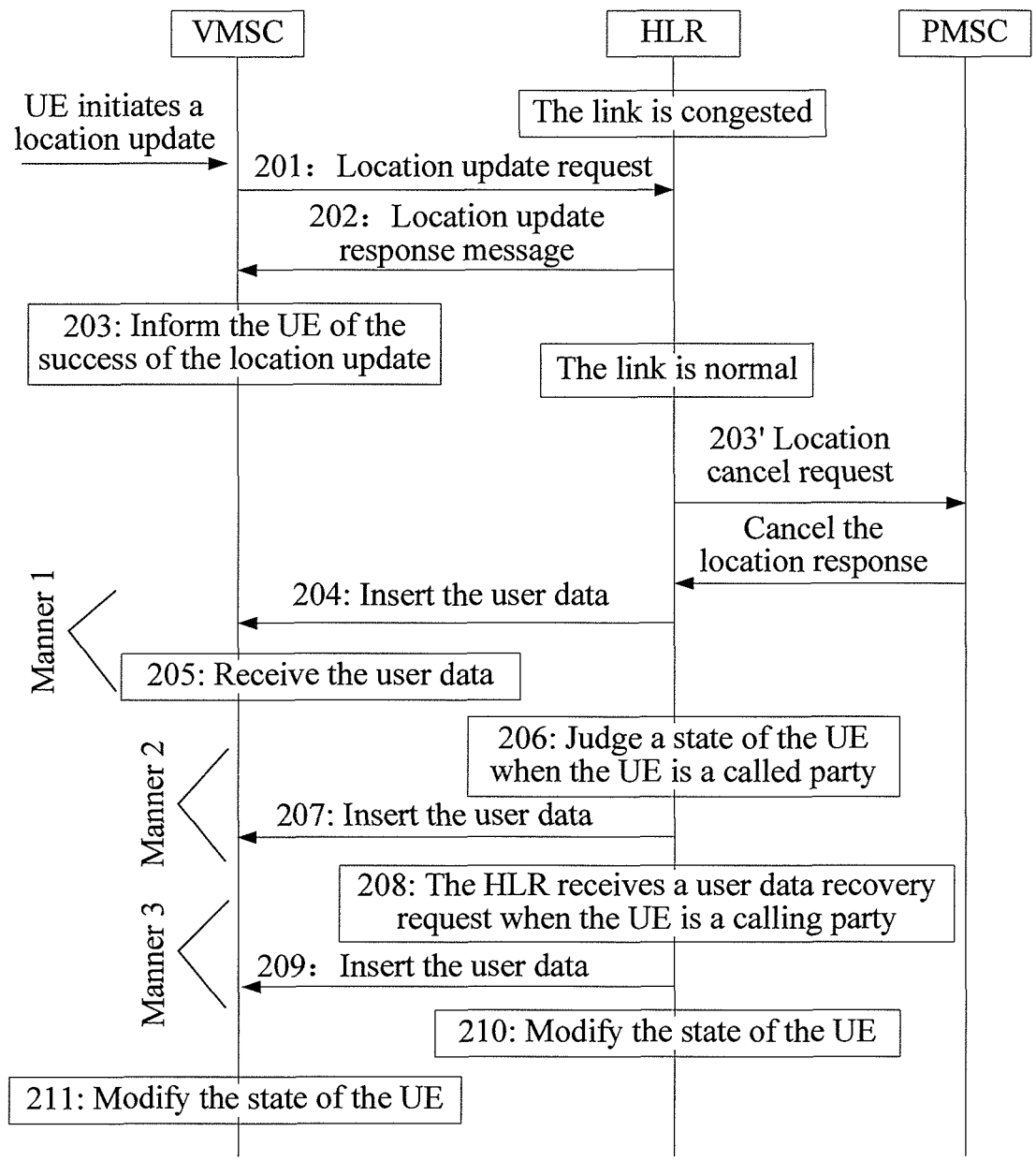
FIG. 2 is a schematic flow chart of another method for implementing smoothing of signaling traffic according to an embodiment of the present invention.

It should be noted that, in an existing mobile communication system, an interface between a mobile switching center (MSC, Mobile Switching Center) and an HLR is a C interface, and an interface between a VLR and the HLR is a D interface. Currently, the MSC is generally integrated with the VLR, so an information exchange interface between the HLR and the MSC/VLR is described by using a CD interface in the present invention. Meanwhile, since the MSC and VLR are generally combined into one device, the MSC or the VLR described in the embodiments of the present invention may represent the MSC/VLR. In addition, a VMSC mentioned in the embodiments of the present invention is a visited MSC and indicates an MSC where a UE resides; and a PMSC mentioned in the embodiments of the present invention is a previous MSC where the UE resides, that is, an MSC where the UE resides before moving to the VMSC.

The inventors find that, a location update is closely coupled to downloading of user data, and an existing location update includes two parts: one part is an update of information about a location visited by the UE, and the other part is that the HLR sends the user data to a visited VLR. User data information is more than location information, and a sending mechanism from the HLR to the VLR may be performing the sending multiple times. One time of failure may cause the whole sending of the user data to fail, thereby causing a failure of the whole location update. The failure of the location update may further cause that a mobile phone initiates the location update again, and a vicious circle is formed accordingly, which finally leads to a breakdown of the whole system.

Since message traffic of the CD interface is asymmetric, generally, signaling link congestion occurs from the HLR to the VLR first, and at this time, if the HLR can take a measure to ensure success of the location update of the UE first, a series of problems caused by the failure of the location update can be avoided. The location update of the UE has two objectives: One is to update location information, so that the UE can be found when being called, and the other one is to obtain the user data from the HLR, where the user data is obtained so as to be used when a service is provided for the UE. It should be understood that, a proportion of a UE that performs a service at the same time when a location of the UE is updated is very low, so at this time, it is not mandatory to download the user data for a UE that does not perform a service. Therefore, when the signaling link congestion occurs at the CD interface, the HLR may perform a location update operation first and does not perform obtaining of the user data temporarily, and only data downloading for the UE that performs a service is ensured first. In this way, use of the UE is not affected, and meanwhile, a problem occurred in the case of message congestion at the CD interface. That is to say, the two functions of the location update and the obtaining the user data are logically separated; in a normal case, processing may be performed according to an existing manner; and when the message congestion at the CD interface or the HLR overload occurs, a separation manner may be adopted for processing to control the signaling traffic and the load of the HLR, thereby avoiding an occurrence of a severe consequence.

As shown in FIG. 1, a method for implementing smoothing of signaling traffic provided in an embodiment of the present invention includes:

Step 101: When a link between an HLR and an exchange device is congested or the HLR is overloaded, the HLR receives a location update request message of a user equipment UE sent by the exchange device, and returns a location update response message to the exchange device, so as to inform the exchange device that the location update of the UE is successful, where the HLR does not send user data corresponding to the UE to the exchange device.

Step 102: When the link between the HLR and the exchange device is normal, the load of the HLR is normal, or the UE performs a service, the HLR sends the user data corresponding to the UE to the exchange device.

It should be noted that, the exchange device is a mobile switching center MSC, a serving GPRS support node (SGSN, Serving GPRS Support Node), or a VLR. For example, when a system is a Global System for Mobile Communication (GSM, Global System for Mobile communication), a Code Division Multiple Access (CDMA, Code Division Multiple Access), or a Universal Mobile Telecommunication System (UMTS, Universal Mobile Telecommunication System), the exchange device may be the MSC or the VLR (which may be generically referred to as an MSC/VLR); and when the system is a General Packet Radio Service (GPRS, General Packet Radio Service), the exchange device may be the SGSN.

It should be noted that, the user data mentioned in this embodiment of this application may be user subscription data.

This embodiment of the present invention provides the method for implementing smoothing of signaling traffic, which reduces the signaling traffic and the load of the HLR by canceling the sending of the user data to the exchange device in the case that the link between the HLR and the exchange device is congested or the HLR is overloaded, thereby effectively achieving an objective of controlling system traffic and avoiding a vicious circle of repeated location updates and an HLR breakdown when link signaling congestion or HLR overload occurs. Furthermore, when the link between the HLR and the exchange device is normal, the load of the HLR is normal, or the UE performs a service, the HLR sends the user data to the exchange device, thereby achieving normal performing of the service.

FIG. 2 shows another method for implementing smoothing of signaling traffic according to an embodiment of the present invention, and this embodiment of the present invention is applied to a GSM/UMTS system, and includes:

Step 201: An HLR receives a location update request message of a UE sent by a VMSC (that is, an MSC of a visited domain where the UE resides, and in a specific practical application scenario, the VMSC may be replaced by an MSC/VLR or a VLR), where the location update request message is used to perform a location update of the UE; and the location update request message may include a separation capability identifier of the VMSC, and the separation capability identifier is used to indicate whether the VMSC has a capability of making a location update function and a user data downloading function separated from each other.

Step 202: When a CD interface link between the HLR and the VMSC/VLR is congested or the HLR is overloaded, the HLR can know, according to the separation capability identifier of the VMSC included in the location update request message that is sent by the VMSC, that the VMSC has the separation capability, and the HLR sends a location update response message to the VMSC, where the location update response message includes a fake online identifier, the fake online identifier is used to indicate that the UE is in a fake online state, and the fake online state means that the HLR informs the VMSC that the location update of the UE is successful and does not send user data to the VMSC. The HLR may further record the fake online identifier of the UE, that is, set the UE in the fake online state.

Step 203: The VMSC receives the location update response message sent by the HLR. Since the location update response message includes the fake online identifier, the VMSC may confirm that the UE is in the fake online state and inform the UE of the success of the location update.

Step 204: When the CD interface link between the HLR and the VMSC/VLR is normal or the load of the HLR is normal, the HLR detects the UE in the fake online state according to the fake online identifier and sends a user data message to the VMSC corresponding to the UE in the fake online state.

Step 205: The VMSC receives the user data message and records the user data in the VLR.

It should be noted that, in an existing GSM/UMTS system, the sending the user data is a necessary step in a location update process. If the location update response message is directly returned without sending the user data, the location update process fails, and the MSC does not send a location update success response to the UE. In this case, the UE may repeatedly initiate the location update. Therefore, for the MSC, the separation capability identifier needs to be added for indicating that the MSC has the capability of making the location update and the downloading of the user data separated from each other. After the MSC/VLR initiates the location update request message to the HLR, if the user data sent by the HLR is not received while a location update reception message is directly received, the MSC returns location update success to the UE. In step 201, the VMSC informs the HLR of the separation capability of the VMSC through the separation capability identifier included in the location update request message, so that a separation policy may be adopted for the location update sent by the VMSC when the CD interface link between the HLR and the VMSC/VLR is congested or the HLR is overloaded. The separation capability identifier of the VMSC may not be included in the location update request message in step 201, but information about separation capabilities of all MSCs is informed to the HLR through a pre-configuration manner or is sent to the VLR through another message.

It should be further noted that, according to an existing location update process, after the location update of the UE is successful, and the HLR returns the location update response message to the VMSC, the HLR may send a user data deletion message to a PMSC/VLR for instructing the PMSC/VLR to delete locally saved user data information of the UE. However, in the case that the link between the HLR and the PMSC/VLR is congested or the HLR is overloaded, a direct signaling exchange between the HLR and the PMSC/VLR may further aggravate the signaling traffic and increase the load of the HLR, thereby increasing a risk of an HLR breakdown. Therefore, an improved design for the foregoing process is performed in this embodiment of the present invention, in which after step 202, the HLR does not send the user data deletion message to the PMSC/VLR, but the HLR initiates a user data deletion process to the PMSC/VLR in the case that the signaling traffic on the link between the HLR and the VMSC/VLR is normal or the load of the HLR is normal. That is, after step 202, the method may further include:

Step 203': After the HLR returns the location update response message to the VMSC, the HLR does not immediately send the user data deletion message to the PMSC/VLR, but initiates the user data deletion process to the PMSC/VLR (that is, delivering a location cancel request message to the PMSC) in the case that the signaling traffic on the link between the HLR and the VMSC/VLR is normal or the load of the HLR is normal.

As for step 203', it should be noted that, step 203' has no sequential correlation with steps 204 and 205, and may be performed before, after or between steps 204 and 205. On the other hand, in some specific application architecture, in the case that the VMSC/VLR and the PMSC/VLR are connected to the HLR through a same STP, or that the VMSC/VLR and the PMSC/VLR share a part of the link, that the HLR does not send the user data deletion message to the PMSC/VLR may effectively reduce the link signaling traffic and the load of the HLR, thereby avoiding the link congestion and a system breakdown.

In this embodiment, step 204 and step 205 are subsequent processes of sending the user data to the VMSC/VLR by the HLR in the case that the link signaling traffic is normal or the load of the HLR is normal, which may be referred to as manner 1 herein. Likewise, the HLR may send the user data when the UE performs a service, so that the service can be normally performed, where the service may include a calling service and a called service. Correspondingly, the HLR may send the user data to the VMSC/VLR by adopting the following two manners.

Manner 2: When the UE performs a called service, a calling-side device obtains routing information of the UE from the HLR, and the HLR judges whether the UE is in the fake online state according to whether the UE includes the fake online identifier. If the UE includes the fake online identifier, it is determined that the UE is in the fake online state, and a user data sending process is initiated to the VMSC/VLR to send the user data to the VMSC/VLR where the UE resides, so that the subsequent service can be normally performed. That is, manner 2 includes the following steps:

Step 206: The HLR receives, from the calling-side device, a message for obtaining the routing information of the UE, judges whether the UE is in the fake online state according to whether the UE includes the fake online identifier, where the fake online state represents that the HLR returns the location update response message to the VMSC/VLR where the UE resides, but does not send the user data.

Step 207: If the UE is in the fake online state, the HLR initiates the user data sending process to send the user data to the VMSC/VLR where the UE resides, so that the subsequent service can be normally performed.

Manner 3: When the UE performs a calling service, the VMSC/VLR where the UE resides judges whether the UE is in the fake online state, that is, judges whether the UE has the fake online identifier; if yes, it proves that the VMSC/VLR does not store the user data information of the UE, and the UE is in the fake online state. The VMSC/VLR actively initiates a data recovery process to the HLR to request the HLR to send the user data to the VMSC/VLR. That is, manner 3 includes:

Step 208: The VMSC/VLR receives the calling service initiated by the UE, judges whether the UE is in the fake online state, and if yes, initiates the data recovery process to the HLR, that is, sends a user data recovery request to the HLR, where the user data recovery request carries number information of the UE.

Step 209: The HLR receives the user data recovery request and sends the user data to the VMSC/VLR.

Through the foregoing three manners, the VMSC/VLR obtains the user data of the UE, which ensures normal performing of the subsequent service. After the user data is obtained, the method further includes:

Step 210: After sending the user data of the UE to the VMSC/VLR through the foregoing three manners, the HLR deletes the fake online identifier of the UE, that is, the UE is not in the fake online state any longer.

Step 211: After obtaining the user data of the UE in the fake online state, the VMSC/VLR deletes the fake online identifier of the UE.

Furthermore, step 203' may be performed after step 210, that is, the PMSC/VLR is instructed to delete the user data of the UE after the HLR deletes the fake online identifier of the UE.

This embodiment of the present invention provides the another method for implementing smoothing of signaling traffic and the method is based on the GSM/UMTS system, which reduces the signaling traffic at the CD interface and the load of the HLR by canceling the sending of the user data to the VMSC/VLR in the case that the CD interface link between the HLR and the VMSC/VLR is congested or the HLR is overloaded, thereby effectively achieving an objective of controlling system traffic and avoiding a vicious circle of repeated location updates and the HLR breakdown when CD interface signaling congestion or HLR overload occurs. Furthermore, when the CD interface link between the HLR and the VMSC/VLR is normal, the load of the HLR is normal, or the UE performs a service, the HLR sends the user data to the VMSC/VLR, thereby achieving the normal performing of the service.

The embodiment corresponding to FIG. 2 is based on the GSM/UMTS system. Likewise, as for a GPRS system, a processing process for smoothing signaling traffic is similar to the embodiment corresponding to FIG. 2, except that the VMSC in the embodiment corresponding to FIG. 2 is replaced by an SGSN.

Figure 3:
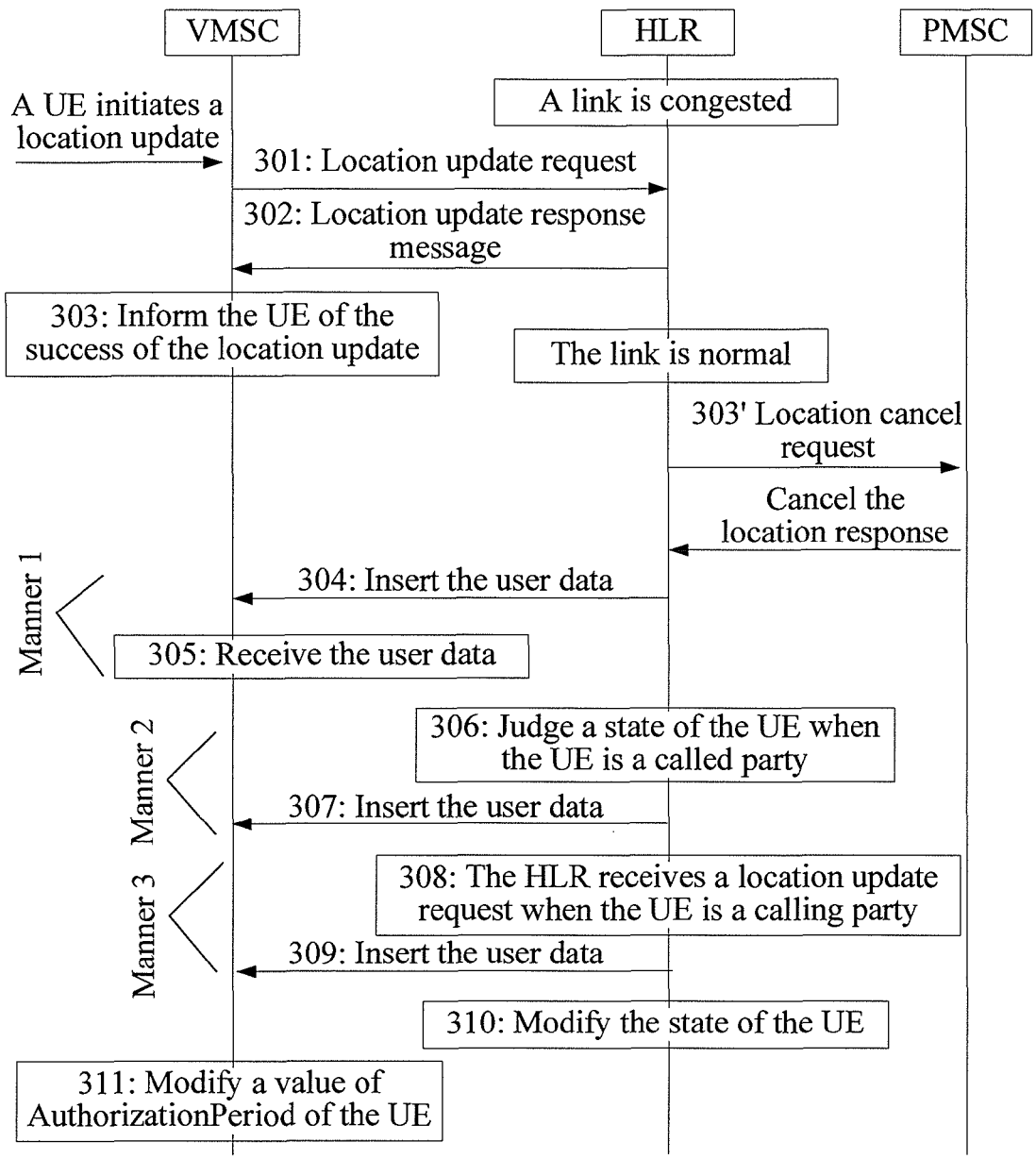
FIG. 3 is a schematic flow chart of another method for implementing smoothing of signaling traffic according to an embodiment of the present invention.

FIG. 3 shows another method for implementing smoothing of signaling traffic according to an embodiment of the present invention. This embodiment of the present invention is applied to a CDMA system, and the method includes:

Step 301: A VMSC receives a location update request message sent by a UE, and forwards the location update request message to an HLR, where the location update request message may include number information of the UE.

Step 302: When a CD interface link between the HLR and the VMSC/VLR is congested or the HLR is overloaded, the HLR allocates a fake online identifier to the UE to set the UE in a fake online state, returns a location update response message to the VMSC, and sets a value of AuthorizationPeriod in the location update response message to 1, where the location update response message does not include user data, that is, the HLR does not deliver the user data corresponding to the UE to the VMSC/VLR.

Step 303: The VMSC receives the location update response message and informs the UE of success of the location update.

Step 304: When the CD interface link between the HLR and the VMSC/VLR is normal or the load of the HLR is normal, the HLR detects the UE in the fake online state according to the fake online identifier and sends a user data message to the VMSC corresponding to the UE in the fake online state.

Step 305: The VMSC receives the user data message and records the user data in the VLR.

Similar to the foregoing embodiment, in this embodiment of the present invention, after the HLR returns the location update response message to the VMSC, the HLR may not send a user data deletion message to a PMSC/VLR, instead, the HLR initiates a user data deletion process to the PMSC/VLR in the case that the link signaling traffic between the HLR and the VMSC/VLR is normal or the load of the HLR is normal. That is, after step 302, the method may further include:

Step 303': After the HLR returns the location update response message to the VMSC, the HLR does not immediately send the user data deletion message to the PMSC/VLR, but initiates the user data deletion process to the PMSC/VLR in the case that the link signaling traffic between the HLR and the VMSC/VLR is normal or the load of the HLR is normal.

As for step 303', it should be noted that, step 303' has no sequential correlation with steps 304 and 305, and may be performed before, after or between steps 304 and 305. On the other hand, in some specific application architecture, the VMSC/VLR and the PMSC/VLR is connected to the HLR through a same STP, or in the case that the VMSC/VLR and the PMSC/VLR share a part of the link, that the HLR does not send the user data deletion message to the PMSC/VLR may effectively reduce the link signaling traffic and the load of the HLR, thereby avoiding link congestion and a system breakdown.

In this embodiment, step 304 and step 305 are subsequent processes of sending the user data to the VMSC/VLR by the HLR in the case that the link signaling traffic is normal or the load of the HLR is normal, which may be referred to as manner 1 herein. Likewise, the HLR may send the user data when the UE performs a service, so that the service can be normally performed, where the service may include a calling service and a called service. Correspondingly, the HLR may send the user data to the VMSC/VLR by adopting the following two manners.

Manner 2: When the UE performs a called service, a calling-side device obtains routing information of the UE from the HLR, and the HLR judges whether the UE is in the fake online state according to whether the UE includes the fake online identifier. If the UE includes the fake online identifier, it is determined that the UE is in the fake online state, and a user data sending process is initiated to the VMSC/VLR to send the user data to the VMSC/VLR where the UE resides, so that the subsequent service can be normally performed. That is, manner 2 includes the following steps:

Step 306: The HLR receives, from the calling-side device, a message for obtaining the routing information of the UE, judges whether the UE is in the fake online state according to whether the UE includes the fake online identifier, where the fake online state represents that the HLR returns the location update response message to the VMSC/VLR where the UE resides, but does not send the user data.

Step 307: If the UE is in the fake online state, the HLR initiates the user data sending process to send the user data to the VMSC/VLR where the UE resides, so that the subsequent service can be normally performed.

Manner 3: When the UE performs a calling service, the VMSC/VLR where the UE resides judges whether a value of AuthorizationPeriod corresponding to the UE is 1. If yes, the VMSC/VLR actively initiates a location update process to the HLR. Correspondingly, manner 3 includes:

Step 308: The VMSC/VLR receives the calling service initiated by the UE and judges whether the value of AuthorizationPeriod corresponding to the UE is 1. If yes, the VMSC/VLR actively initiates the location update process to the HLR.

Step 309: The HLR receives the location update request message sent by the VMSC/VLR, and sends the user data to the VMSC/VLR. It should be noted that in this step, the HLR may also determine whether the UE is in the fake online state according to whether the HLR records the fake online identifier of the UE, if yes, delivers the user data, and if not, determines, according to a current state of the HLR, whether to deliver the user data (for example, when the link between the HLR and the exchange device is congested or the HLR is overloaded, the HLR may not deliver the user data to the VMSC).

Through the foregoing three manners, the VMSC/VLR obtains the user data of the UE, which ensures normal performing of the subsequent service. After the user data is obtained, the method further includes:

Step 310: After sending the user data of the UE to the VMSC/VLR through the foregoing three manners, the HLR deletes the fake online identifier of the UE, that is, the UE is not in the fake online state any longer.

Step 311: After obtaining the user data of the UE in the fake online state, the VMSC/VLR sets the value of AuthorizationPeriod corresponding to the UE to 0, that is, when the UE performs the calling service, it is not required to initiate the location update to the HLR.

Furthermore, step 303' may be performed after step 310, that is, the PMSC/VLR is instructed to delete the user data of the UE after the HLR deletes the fake online identifier of the UE.

This embodiment of the present invention provides the another method for implementing smoothing of signaling traffic and the method is based on the CDMA system, which reduces the signaling traffic at the CD interface and the load of the HLR by canceling the sending of the user data to the VMSC/VLR in the case that the CD interface link between the HLR and the VMSC/VLR is congested or the HLR is overloaded, thereby effectively achieving an objective of controlling system traffic and avoiding a vicious circle of repeated location updates and an HLR breakdown when CD interface signaling congestion or HLR overload occurs. Furthermore, when the CD interface link between the HLR and the VMSC/VLR is normal, the load of the HLR is normal, or the UE performs a service, the HLR sends the user data to the VMSC/VLR, thereby achieving the normal performing of the service.

In addition to the foregoing method embodiments, correspondingly, an embodiment of the present invention further provides a system for implementing smoothing of signaling traffic and a home location register HLR.

Figure 4:
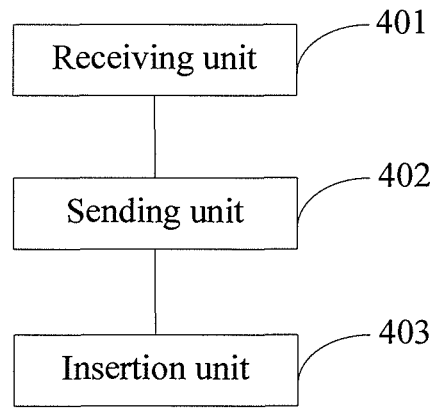
FIG. 4 is a schematic structural diagram of a home location register according to an embodiment of the present invention.

FIG. 4 shows a home location register HLR according to an embodiment of the present invention, which includes a receiving unit 401, a sending unit 402 and an insertion unit 403.

The receiving unit 401 is configured to receive a location update request message of a user equipment UE sent by an exchange device.

The sending unit 402 is configured to return a location update response message to the exchange device when a link between the home location register HLR and the exchange device is congested or the HLR is overloaded, so as to inform the exchange device that the location update of the UE is successful, where the HLR does not send user data corresponding to the UE to the exchange device.

The insertion unit 403 is configured to enable the HLR to send the user data corresponding to the UE to the exchange device when the link between the HLR and the exchange device is normal, the load of the HLR is normal, or the UE performs a service.

The exchange device is a mobile switching center MSC, a serving GPRS support node SGSN or a VLR.

Figure 5:
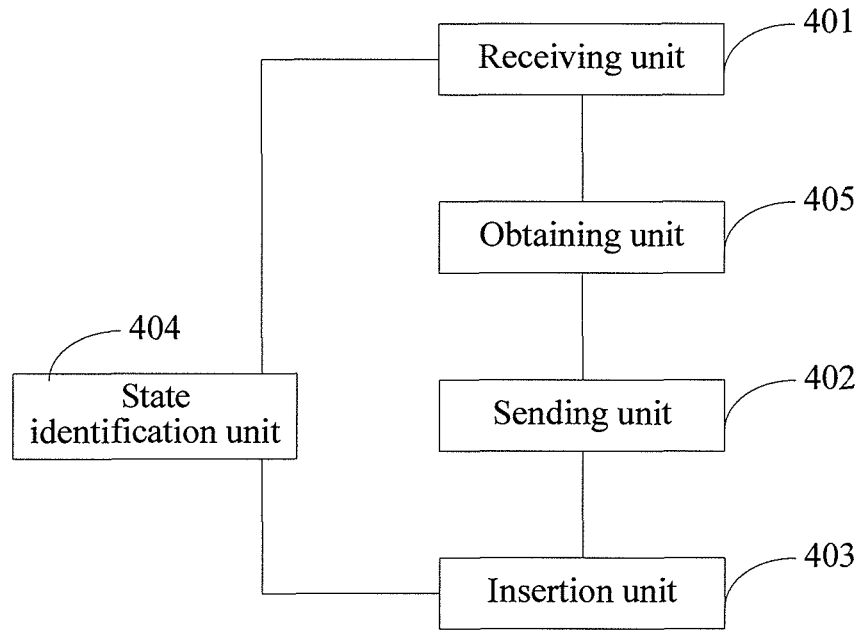
FIG. 5 is a schematic structural diagram of another home location register according to an embodiment of the present invention.

More particularly, FIG. 5 shows another home location register according to an embodiment of the present invention, which specifically provides further details of FIG. 4 and further includes a state identification unit 404 and an obtaining unit 405 in addition to the receiving unit 401, the sending unit 402 and the insertion unit 403.

The state identification unit 404 is configured to allocate a fake online identifier to the UE after the receiving unit 401 receives the location update request message of the UE and when the link between the HLR and the exchange device is congested or the HLR is overloaded, where the fake online identifier is used to indicate that the UE is in a fake online state.

When the system is a Global System for Mobile Communication GSM, a General Packet Radio Service System CPRS or a Universal Mobile Telecommunication System UMTS, the HLR further includes the obtaining unit 405, where the obtaining unit 405 is configured to obtain a separation capability of the exchange device. Further, the obtaining unit 405 is specifically configured to obtain a separation capability identifier of the exchange device from the location update request message received by the receiving unit 401, where the separation capability identifier is used to indicate that the exchange device has a capability of making a location update function and a user data downloading function separated from each other.

In a specific implementation manner, the insertion unit 403 is specifically configured to enable the HLR to determine the UE in the fake online state according to the fake online identifier, and send the user data corresponding to the UE to the exchange device corresponding to the UE when the link between the HLR and the exchange device is normal and the load of the HLR is normal.

In another specific implementation manner, the insertion unit 403 is specifically configured to judge whether the UE is in the fake online state according to whether the UE includes the fake online identifier when the UE performs a calling service or a called service. If yes, the HLR sends the user data to the exchange device corresponding to the UE.

In an existing location update process, after receiving a location update request message sent by the exchange device where the UE currently resides, the HLR needs to initiate a user data deletion process to a previous exchange device PMSC where the UE resides. When the link between the HLR and the exchange device where the UE resides is congested or the HLR is overloaded, the user data deletion process may further aggregate the signal traffic and increase the load of the HLR. The process is changed in this embodiment of the present invention, that is, the HLR does not initiate the user data deletion process temporarily when the link between the HLR and the exchange device where the UE resides is congested or the HLR is overloaded. Correspondingly, when the system returns to be normal, the sending unit 402 is further configured to initiate the user data deletion process to the previous exchange device where the UE resides to delete user data that correspond to the UE and is recorded in the previous exchange device when the link between the HLR and the exchange device is normal or the load of the HLR is normal.

After the insertion unit 403 sends the user data corresponding to the UE to the exchange device, the HLR needs to delete the fake online identifier of the UE recorded by the HLR, that is, the state identification unit 404 is further configured to delete the fake online identifier of the UE recorded by the state identification unit after the insertion unit 403 sends the user data corresponding to the UE to the exchange device where the UE resides.

Figure 6:
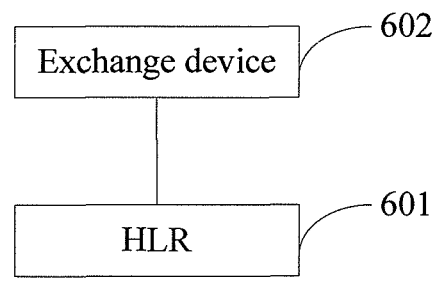
FIG. 6 is a schematic structural diagram of a system for implementing smoothing of signaling traffic according to an embodiment of the present invention.

FIG. 6 shows a system for smoothing signaling traffic according to an embodiment of the present invention, which includes an HLR 601 and an exchange device 602 where a UE resides.

The exchange device 602 is configured to send a location update request message of the user equipment UE to the HLR 601.

The HLR 601 is configured to receive the location update request message sent by the exchange device 602 when a link between the HLR 601 and the exchange device 602 is congested or the HLR is overloaded, so as to inform the exchange device 602 that the location update of the UE is successful, where the HLR 601 does not send user data corresponding to the UE to the exchange device 602; and when the link between the HLR 601 and the exchange device 602 is normal, the load of the HLR 601 is normal, or the UE performs a service, the HLR 601 sends the user data corresponding to the UE to the exchange device 602.

The embodiments of the present invention provides the system for smoothing signaling traffic and the home location register, which reduces the signaling traffic and the load of the HLR by canceling the sending of the user data to the exchange device where the UE resides in the case that the link between the HLR and the exchange device where the UE resides is congested or the HLR is overloaded, thereby effectively achieving an objective of controlling system traffic and avoiding a vicious circle of repeated location updates and an HLR breakdown when link signaling congestion or HLR overload occurs. Furthermore, when the link between the HLR and the exchange device where the UE resides is normal, the load of the HLR is normal, or the UE performs a service, the HLR sends the user data to the exchange device where the UE resides, thereby achieving normal performing of the service.

Those of ordinary skill in the art should understand that all or a part of the steps of the methods according to the embodiments may be implemented by a program instructing relevant hardware. The program may be stored in a computer readable storage medium, such as a ROM/a RAM, a magnetic disk, and a CD-ROM.

The foregoing described only exemplary embodiments of the present invention. It should be noted by persons of ordinary skill in the art that modifications and variations may be made without departing from the principle of the present invention, which should also be construed to be covered by the protection scope of the present invention.

What is claimed is:

1. A method for implementing smoothing of signaling traffic, the method comprising:
when a link between a home location register (HLR) and an exchange device is congested or the HLR is overloaded, receiving, by the HLR, a location update request message of a user equipment (UE) sent by the exchange device, and returning a location update response message to the exchange device, so as to inform the exchange device that the location update of the UE is successful, wherein the HLR does not send user data corresponding to the UE to the exchange device; and
sending, by the HLR, the user data corresponding to the UE to the exchange device when the link between the HLR and the exchange device is normal, the load of the HLR is normal, or the UE performs a service.

2. The method according to claim 1, wherein after the HLR receives the location update request message of the user equipment UE sent by the exchange device, the method further comprises:
allocating, by the HLR, a fake online identifier to the UE, wherein the fake online identifier is used to indicate that the UE is in a fake online state.

3. The method according to claim 2, wherein the location update response message comprises the fake online identifier or a value of AuthorizationPeriod in the location update response message as 1.

4. The method according to claim 3, wherein the sending, by the HLR, the user data corresponding to the UE to the exchange device when the link between the HLR and the exchange device is normal, the load of the HLR is normal, or the UE performs the service specifically comprises:
when the UE is a caller, judging, by the exchange device, according to whether the UE comprises the fake online identifier, whether it is required to request the user data of the UE from the HLR; and
if yes, initiating, by the exchange device, a user data request to the HLR, and receiving the user data that corresponds to the UE and is returned by the HLR.

5. The method according to claim 3, wherein the exchange device is a mobile switching center (MSC), and the sending, by the HLR, the user data corresponding to the UE to the exchange device when the link between the HLR and the exchange device is normal, the load of the HLR is normal, or the UE performs the service specifically comprises:
when the UE is a caller, judging, by the MSC, according to the value of AuthorizationPeriod of the UE, whether it is required to initiate a location update to the HLR; and
if yes, initiating, by the MSC, the location update to the HLR, and receiving the user data that corresponds to the UE and is returned by the HLR.

6. The method according to claim 2, wherein the sending, by the HLR, the user data corresponding to the UE to the exchange device when the link between the HLR and the exchange device is normal, the load of the HLR is normal, or the UE performs the service specifically comprises:
when the link between the HLR and the exchange device is normal or the load of the HLR is normal, determining, by the HLR, the UE in the fake online state according to the fake online identifier, and sending the user data corresponding to the UE to the exchange device corresponding to the UE.

7. The method according to claim 2, wherein the sending, by the HLR, the user data corresponding to the UE to the exchange device when the link between the HLR and the exchange device is normal, the load of the HLR is normal, or the UE performs the service specifically comprises:
when the UE is a called party, receiving, by the HLR, a routing request sent by a calling-side device, and judging whether the UE is in the fake online state according to whether the UE comprises the fake online identifier; and
if yes, sending, by the HLR, the user data to the exchange device corresponding to the UE.

8. The method according to claim 2, wherein after the sending, by the HLR, the user data corresponding to the UE to the exchange device, the method further comprises:

deleting, by the HLR, the fake online identifier of the UE recorded in the HLR.

9. The method according to claim 1, wherein before the returning the location update response message to the exchange device, the method further comprises:

obtaining, by the HLR, a separation capability of the exchange device.

10. The method according to claim 9, wherein the location update request message comprises a separation capability identifier of the exchange device, and the separation capability identifier is used to indicate that the exchange device has a capability of making a location update function and a user data downloading function separated from each other; and correspondingly, the obtaining, by the HLR, the separation capability of the exchange device specifically is obtaining, by the HLR, the separation capability identifier of the exchange device from the location update request message.

11. The method according to claim 1, wherein after the returning the location update response message to the exchange device, and before the link between the HLR and the exchange device is normal or the load of the HLR is normal, the HLR does not initiate a user data deletion process to a previous exchange device where the UE resides.

12. The method according to claim 1, further comprising:

when the link between the HLR and the exchange device is normal or the load of the HLR is normal, initiating, by the HLR, a user data deletion process to a previous exchange device where the UE resides to delete the user data that corresponds to the UE and is recorded in the previous exchange device where the UE resides.

13. A home location register (HLR), comprising:

a receiving unit, configured to receive a location update request message of a user equipment (UE) sent by an exchange device;

a sending unit, configured to return a location update response message to the exchange device when a link between the home location register HLR and the exchange device is congested or the HLR is overloaded, so as to inform the exchange device that the location update of the UE is successful, wherein the HLR does not send user data corresponding to the UE to the exchange device; and an insertion unit, configured to enable the HLR to send the user data corresponding to the UE to the exchange device when the link between the HLR and the exchange device is normal, the load of the HLR is normal, or the UE performs a service.

14. The HLR according to claim 13, further comprising:

a state identification unit, configured to allocate a fake online identifier to the UE after the receiving unit receives the location update request message of the UE and when the link between the HLR and the exchange device is congested or the HLR is overloaded, wherein the fake online identifier is used to indicate that the UE is in a fake online state.

15. The HLR according to claim 14, wherein the insertion unit is specifically configured to determine, by the HLR, the UE in the fake online state according to the fake online identifier, and send the user data corresponding to the UE to the exchange device corresponding to the UE when the link between the HLR and the exchange device is normal and the load of the HLR is normal.

16. The HLR according to claim 14, wherein the state identification unit is further configured to delete the fake online identifier of the UE recorded in the state identification unit after the insertion unit sends the user data corresponding to the UE to the exchange device.

17. The HLR according to claim 13, further comprising:

an obtaining unit, configured to obtain a separation capability of the exchange device.

18. The HLR according to claim 17, wherein the obtaining unit is specifically configured to obtain a separation capability identifier of the exchange device from the location update request message received by the receiving unit, wherein the separation capability identifier is used to indicate that the exchange device has a capability of making a location update function and a user data downloading function separated from each other.

19. The HLR according to claim 13, wherein the insertion unit is specifically configured to judge whether the UE is in a fake online state according to whether the UE comprises a fake online identifier when the UE performs a calling service or a called service, and if yes, enable the HLR to send the user data to the exchange device corresponding to the UE.

20. The HLR according to claim 13, wherein the sending unit is further configured to initiate a user data deletion process to a previous exchange device where the UE resides to delete the user data corresponding to the UE recorded in the previous exchange device when the link between the HLR and the exchange device is normal or the load of the HLR is normal.

21. A system for smoothing signaling traffic, the system comprising a home location register (HLR) and an exchange device, wherein the exchange device is configured to send a location update request message of a user equipment (UE) to the HLR; and the HLR is configured to receive the location update request message sent by the exchange device when a link between the HLR and the exchange device is congested or the HLR is overloaded, and return a location update response message to the exchange device, so as to inform the exchange device that the location update of the UE is successful, wherein the HLR does not send user data corresponding to the UE to the exchange device; and when the link between the HLR and the exchange device is normal, the load of the HLR is normal, or the UE performs a service, the HLR sends the user data corresponding to the UE to the exchange device.

* * * * *